(12) United States Patent
Liu et al.

(10) Patent No.: US 12,445,367 B2
(45) Date of Patent: Oct. 14, 2025

(54) METHOD FOR SENDING AND FORWARDING PACKET, HEAD NODE, FORWARDING NODE AND STORAGE MEDIUM

(71) Applicant: ZTE CORPORATION, Guangdong (CN)

(72) Inventors: Yao Liu, Guangdong (CN); Zheng Zhang, Guangdong (CN); Aihua Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 366 days.

(21) Appl. No.: 17/925,349

(22) PCT Filed: Apr. 13, 2021

(86) PCT No.: PCT/CN2021/086898
§ 371 (c)(1),
(2) Date: Nov. 15, 2022

(87) PCT Pub. No.: WO2021/227746
PCT Pub. Date: Nov. 18, 2021

(65) Prior Publication Data
US 2023/0179510 A1    Jun. 8, 2023

(30) Foreign Application Priority Data
May 15, 2020  (CN) .......................... 202010413305.0

(51) Int. Cl.
H04L 45/02  (2022.01)
(52) U.S. Cl.
CPC .................... H04L 45/04 (2013.01)

(58) Field of Classification Search
None
See application file for complete search history.

(56) References Cited

U.S. PATENT DOCUMENTS

| | | | |
|---|---|---|---|
| 6,094,525 A * | 7/2000 | Perlman | H04L 45/04 709/245 |
| 10,652,133 B1 | 5/2020 | Morris | |

(Continued)

FOREIGN PATENT DOCUMENTS

| | | |
|---|---|---|
| CN | 107968750 A | 4/2018 |
| CN | 111669330 A | 9/2020 |

(Continued)

OTHER PUBLICATIONS

WIPO, International Search Report issued on Jul. 1, 2021.

*Primary Examiner* — Xavier S Wong
(74) *Attorney, Agent, or Firm* — Li & Cai Intellectual Property (USA) Office

(57) ABSTRACT

The present disclosure provides a method for sending a packet, applied to a head node, including: generating a packet according to a transmission path, and sending the packet, with the transmission path passing through at least two domains, the packet including at least one path extension header, and each path extension header corresponding to one domain through which the transmission path passes and being configured to define the transmission path of the packet in the one domain. The present disclosure further provides a method for forwarding a packet, a head node, a forwarding node and a computer-readable medium.

17 Claims, 5 Drawing Sheets

(56) References Cited

U.S. PATENT DOCUMENTS

| | | |
|---|---|---|
| 11,050,657 B2 | 6/2021 | Zhang et al. |
| 2015/0293873 A1* | 10/2015 | Shao ..................... G06F 13/404 |
| | | 710/314 |
| 2020/0053000 A1 | 2/2020 | Zhang et al. |
| 2020/0127913 A1 | 4/2020 | Filsfils et al. |
| 2021/0409242 A1 | 12/2021 | Xie et al. |
| 2022/0159505 A1* | 5/2022 | Guichard ................ H04L 45/64 |
| 2023/0040043 A1* | 2/2023 | Chen ..................... H04L 69/04 |

FOREIGN PATENT DOCUMENTS

| | | |
|---|---|---|
| CN | 112511424 A | 3/2021 |
| WO | WO 2019222927 A1 | 11/2019 |

\* cited by examiner

METHOD FOR SENDING AND FORWARDING PACKET, HEAD NODE, FORWARDING NODE AND STORAGE MEDIUM

CROSS-REFERENCE TO RELATED APPLICATIONS

The present application claims the priority of Chinese Patent Application No. 202010413305.0, filed on May 15, 2020, the contents of which are incorporated herein in their entirety by reference.

TECHNICAL FIELD

The present disclosure relates to the field of packet technologies, and in particular, to a method for sending a packet, a method for forwarding a packet, a head node, a forwarding node, and a computer-readable medium.

BACKGROUND

To determine a transmission path of a packet, a path extension header representing the transmission path may be carried in a header of the packet, and a list may be configured in the path extension header to represent information of the transmission path, so that a subsequent node forwards the packet according to the list.

In many cases, the transmission path may pass through a plurality of different domains, but information of the transmission path in the different domains being placed in one path extension header is not beneficial for planning and processing of the transmission path.

SUMMARY

In a first aspect, the present disclosure provides a method for sending a packet, applied to a head node, including: generating a packet according to a transmission path, and sending the packet, with the transmission path passing through at least two domains, the packet including at least one path extension header, and each path extension header corresponding to one domain through which the transmission path passes and being configured to limit the transmission path of the packet in the one domain.

In a second aspect, the present disclosure provides a method for forwarding a packet, applied to a forwarding node, including: receiving a packet, with a transmission path of the packet passing through at least two domains, the packet including at least one path extension header, and each path extension header corresponding to one domain through which the transmission path passes and being configured to limit the transmission path of the packet in the one domain; determining one path expansion header in the packet as a path expansion header to be processed according to a preset rule; and forwarding the packet according to the path extension header to be processed.

In a third aspect, the present disclosure provides a head node, including: a first sending module configured to send a packet; at least one processor; and a memory having at least one program stored thereon, the at least one program, when executed by the at least one processor, causes the at least one processor to perform the method for sending a packet described above.

In a fourth aspect, the present disclosure provides a forwarding node, including: a second sending module configured to send a packet; a first receiving module configured to receive a packet; at least one processor; and a memory having at least one program stored thereon, the at least one program, when executed by the at least one processor, causes the at least one processor to perform the method for forwarding a packet described above.

In a fifth aspect, the present disclosure provides a computer-readable medium having a computer program stored therein, the computer program, when executed by a processor, performs the method for sending a packet described above.

In a sixth aspect, the present disclosure provides a computer-readable medium having a computer program stored therein, the computer program, when executed by a processor, performs the method for forwarding a packet described above.

BRIEF DESCRIPTION OF DRAWINGS

In the accompanying drawings provided in the present disclosure.

DETAIL DESCRIPTION OF EMBODIMENTS

Figure 1:
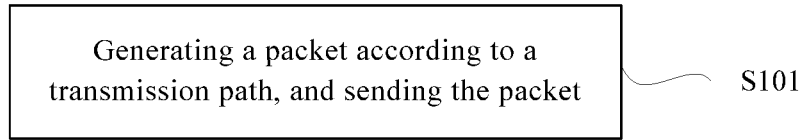
FIG. 1 is a flowchart illustrating a method for sending a packet according to the present disclosure.

In order to make those skilled in the art better understand technical solutions of the present disclosure, a method for sending a packet, a method for forwarding a packet, a head node, a forwarding node and a computer-readable medium according to the present disclosure are further described in detail below with reference to the accompanying drawings.

Exemplary embodiments are described in detail below with reference to the accompanying drawings, but may be embodied in different forms, and should not be construed as a limitation. The embodiments are illustrated merely for those skilled in the art fully understanding the scope of the present disclosure.

Embodiments of the present disclosure may be described with reference to plan and/or cross-sectional views by way of idealized schematic illustrations of the present disclosure. Therefore, the example illustrations may be modified in accordance with manufacturing techniques and/or tolerances.

The embodiments of the present disclosure and technical features in the embodiments may be combined with each other if no conflict is incurred.

The terms used in the present disclosure are for a purpose of describing particular embodiments only, and are not intended to limit the present disclosure. As used herein, a term "and/or" includes any and all combinations of one or more of listed items. As used in the present disclosure, singular forms "a" and "the" are intended to include plural forms as well, i.e., to represent at least one, unless the context clearly defines otherwise. It should further be understood that terms "includes" and/or "made of" in the present disclosure are used to specify a presence of at least one of recited features, integers, steps, operations, elements or components, but may not preclude a presence or an addition of at least one of other features, integers, steps, operations, elements, components or groups thereof.

Unless otherwise defined, meanings of all terms (including technical terms and scientific terms) used herein are same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Embodiments of the present disclosure are not limited to those shown in the accompanying drawings, but include embodiments in which any configuration is modified based on a manufacturing process.

In a first aspect, the present disclosure provides a method for sending a packet, which is applied to a head node.

The method for sending a packet provided in the present disclosure is performed by the head node so that the head node generates a packet and sends the packet.

It should be understood that in the present disclosure, the head node and the subsequent forwarding node may be specific nodes respectively in a network, or may be relative concepts. For example, in a certain process of transmitting a packet, if a certain node in a network executes operations of generating and sending the packet, the certain node is the head node; in another process of transmitting a packet, if the certain node executes an operation of forwarding the packet, the certain node is the forwarding node.

Referring to FIG. 1, the method for sending a packet according to the present disclosure includes an operation S101.

At operation S101, generating a packet according to a transmission path, and sending the packet.

In the method for sending a packet provided in the present disclosure, the transmission path may pass through at least two domains, the packet includes at least one path extension header, and each path extension header corresponds to one domain through which the transmission path passes and is configured to limit the transmission path of the packet in the one domain.

The transmission path refers to a path formed by nodes (which may be physical devices, services, etc.) through which the packet is expected to pass.

The domain refers to a classification of nodes in a network according to a certain criterion, i.e. the nodes in a same domain are classified into a same classification. The above criterion for the classification may be various, and for example, the nodes may be classified according to physical types, locations, encoding ways, functions, management ways, or the like of the nodes.

For example, the domain may be a service domain, a transmission path in the service domain is a service function chain (SFC) for providing an ordered service for an application layer, and each node in the service function chain may be a service function (SF) (such as a firewall (FW), a load balance (LB), or the like), or may be a service function forwarder (SFF) for forwarding a packet.

Figure 8:
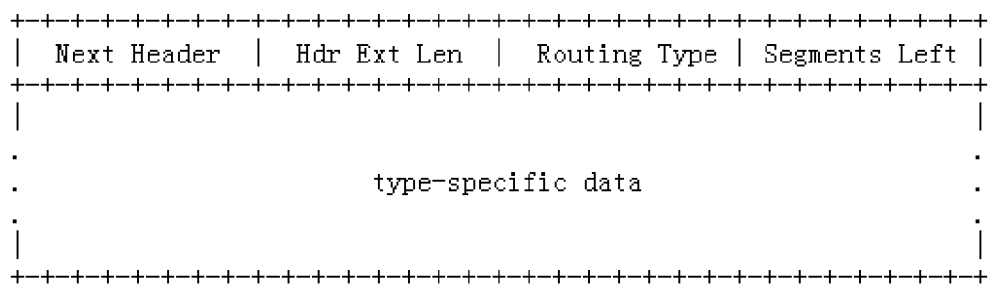
FIG. 8 is a schematic diagram of a format of an internet protocol version 6 (IPv6) routing header according to the present disclosure.

Illustratively, the transmission path in the service domain may be represented by addresses or identifiers of nodes (SF or SFF), and may also be represented by information of a link. For example, referring to FIG. 8, a transmission path may be represented by a service path identifier (SPI) in a network service header (NSH), and corresponding nodes (SF or SFF) are expected to maintain a corresponding relationship between SPIs and transmission paths.

Illustratively, the above SFC may be hierarchical, i.e., a large-scale SFC may be decomposed into a plurality of sub-service chains, so as to facilitate design and control for the service.

For example, the domain may be a path domain, such as a network forwarding domain, and a node of a transmission path in the path domain may be a network device (such as a router, etc.) with a forwarding function. The transmission path in the path domain may also be represented by various modes.

Illustratively, the transmission path in the path domain may be represented in a way of a segment routing (SR). The technology of SR may be implemented by a multi-protocol label switching (MPLS) network or an internet protocol version 6 (IPv6), or the like, a path extension header in the technology of SR is a segment routing header (SRH), and the SRH carries a plurality of segment identifiers (SIDs), and each SID may be configured to represent one node, one link, or a certain operation.

Illustratively, the above SID may be in a form of an IPv6 address, i.e., a 128-bit address. Alternatively, the SID may be compressed into other lengths, and a compressed SID has a certain relation with the IPv6 address, thus may be in other encoding forms such as 64-bit, 32-bit, 16-bit, or the like.

For example, the domain may be a plurality of consecutive nodes belonging to a same type in the transmission path, that is, the domain is a domain segment.

Illustratively, assuming that a transmission path is R1-R2-R3-S1-S2-S3-R11-R12, the R denotes a node in the transmission path and the S denotes a service node (SF or SFF), <R1, R2, R3, R11, R12> may be classified into one domain, and <S1, S2, S3> may be classified into another domain. Alternatively, <R1, R2, R3> may be classified into a first domain (Domain1), <S1, S2, S3> may be classified into a second domain (Domain2), and <R11, R12> may be classified into a third domain (Domain3).

It can be seen that, due to different criteria for a division of domains, a same node may belong to different domains according to different criteria. For example, nodes belonging to a same path domain may belong to different autonomous system (AS) domains.

It can be seen that, types of nodes, encoding modes, parsing modes, or the like of the transmission path in different domains all may be different, and therefore, in existing technologies, it is not facilitated for planning and processing of services to place information of the transmission path in different domains in one path extension header.

In the method for sending a packet provided in the present disclosure, the transmission path of the packet passes through at least two domains, i.e., the packet is transmitted across domains, and the head node may encapsulate one or more path extension headers into the packet, and each path extension header is only for one domain, i.e., each path extension header is only configured to indicate the transmission path of the packet in one domain (i.e., the domain corresponding to the path extension header).

When the packet includes a plurality of path extension headers, the path extension headers may be sequentially arranged according to a sequence of domains corresponding to the path extension headers (i.e., a sequence of the domains in the transmission path), and a field of Next Header (for indicating a type of a next header) in the path extension header may be configured to indicate a type of a subsequent extension header (may be a path extension header).

In addition, since there may be a stack of multiple extension headers in the packet, and operations such as insertion and deletion of an extension header may occur during transmission process (detailed later), for conveniences of an operation, a maintenance, a calculation of maximum transmission unit (MTU), and the like, information of stack indication may be added into the packet to indicate that the current packet includes a stack of multiple extension headers, which extension headers are inserted, a size of each inserted extension header, and the like.

In the method for sending a packet provided in the present disclosure, each path extension header in the packet transmitted across domains only defines the transmission path for one domain, and types of nodes, encoding modes, parsing modes or the like of the transmission path in one domain are all the same, so that such path extension headers are convenient to be encapsulated and identified, and are convenient for planning and processing of the transmission path.

In some implementations, each path extension header includes a list including information of the transmission path in the domain corresponding to the path extension header.

Illustratively, each path extension header may include a list therein to represent the information of the transmission path in the domain corresponding to the path extension header.

The information of the transmission path may be represented by the list in various ways. For example, the list may carry different forms of information such as information of nodes (such as segment identifiers), information of links (such as service path identifiers), information of services, or the like, and the above information may be represented by IP addresses, identifiers (IDs), or the like.

Figure 9:
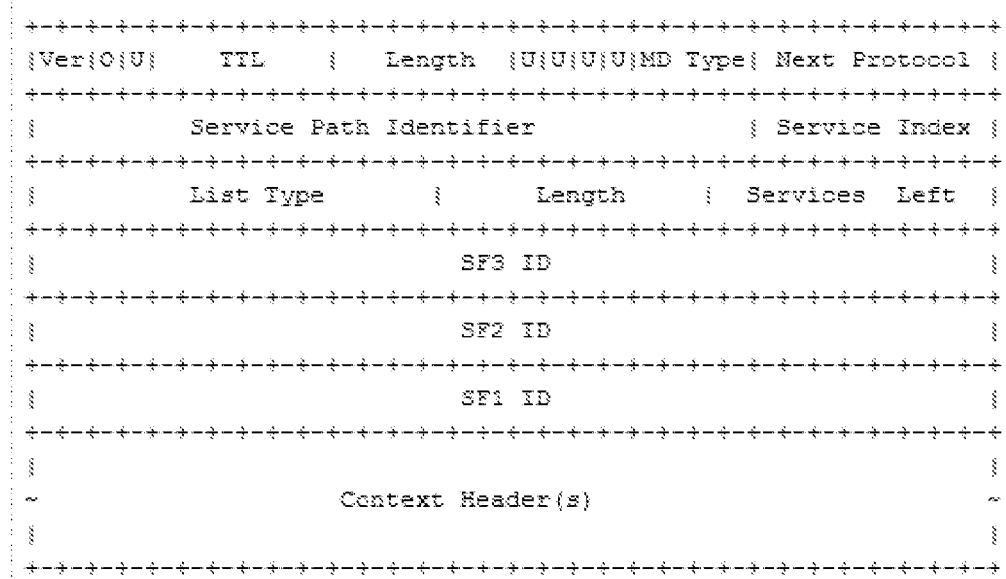
FIG. 9 is a schematic diagram of a format of a network service header carrying a list according to the present disclosure.

Illustratively, in some implementations, referring to FIG. 9, an IPv6 routing header is configured to serve as the path extension header, a value of Routing type indicates a type of the header, each segment identifier indicates information of one node in the transmission path (e.g., a service function chain), and Segment left indicates a current node to be processed.

Illustratively, in some implementations, a SRH may be configured to serve as the path extension header, and each node (SF or SFF) in the transmission path is regarded as a segment identifier to be encoded and processed individually, i.e., the list may be a list of segment identifiers, and each segment identifier represents one node.

Figure 10:
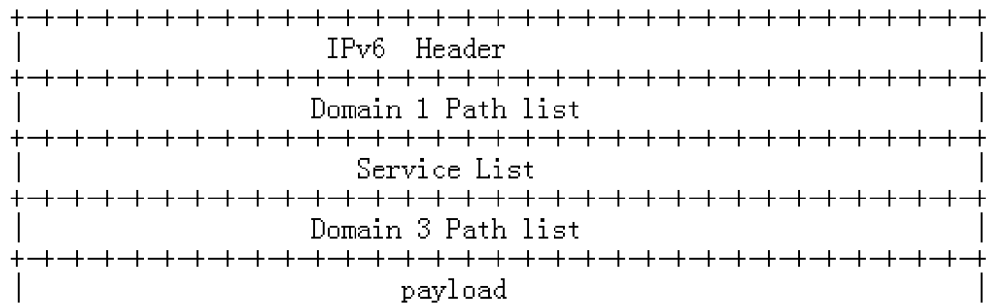
FIG. 10 is a schematic diagram of a format of a packet sent by a head node in a method for sending a packet according to the present disclosure.

Illustratively, in some implementations, referring to FIG. 10, a NSH is configured to serve as the path extension header, and a list is added thereto, each item of the list represents one node (for example, by an SFF/SF ID, and SF1, SF2, and SF3 are illustrated as examples in the FIG. 10) in the transmission path; the SFF/SF ID may be an IP address or an identifier of the SFF/SF, in a case where the SFF/SF ID is the IP address, the IP address may be directly updated into a target address in an IP encapsulation at an outer layer of the packet for forwarding, and in a case where the SFF/SF ID is the identifier, the SFF/SF maintains a forwarding table entry related to the identifier for guiding processing and forwarding of the packet. The above does not change a basic architecture of the NSH, can explicitly express the transmission path and is easy to be implemented.

Certainly, it should be understood that the above ways of representing the transmission path by the list are illustrated as examples, and other forms of representing the transmission path also may be feasible; alternatively, it is also feasible to represent the transmission path in the path extension header by a way not belonging to the form of list.

In some implementations, at least part of the path extension headers each include information of a first boundary node; the first boundary node in each path extension header is a node, in the transmission path, adjacent to the transmission path in the domain corresponding to the path extension header.

It should be understood that in a case where the transmission path passes through multiple domains, a cross-domain propagation of the packet across different domains (or the transmission path in different domains) is involved. Therefore, in some implementations, for part of path extension headers, information of the first boundary node may be desired to define the transmission path in the domain corresponding to each path extension header, i.e., the first boundary node is configured to define how the packet is transmitted from another domain into the domain corresponding to each path extension header, or from the domain corresponding to each path extension header to a next domain.

The first boundary node in each path extension header does not belong to the domain corresponding to the path extension header, but is adjacent to the transmission path in the domain corresponding to the path extension header, i.e., the first boundary node is a last node of the transmission path in the domain previous to the transmission path in the domain corresponding to the path extension header, or is a first node of the transmission path in the domain following the transmission path in the domain corresponding to the path extension header; therefore, the first boundary node is located in the domain adjacent to the domain corresponding to the path expansion header, and is adjacent to the domain corresponding to the path expansion header, so that a path defined by the first boundary node is a part of the transmission path in the domain where the first boundary node is located.

In some implementations, the first boundary node in each the path extension header is a node, in the transmission path, following and adjacent to the transmission path in the domain corresponding to the path extension header.

In some implementations, the above first boundary node being following and adjacent to the transmission path in the domain corresponding to the path expansion header, means that the first boundary node is a first node following the transmission path in the domain corresponding to the path expansion header.

In some implementations, the packet includes a plurality of path extension headers, and each of the path expansion headers corresponds to one of the domains through which the transmission path passes, i.e., the path expansion headers correspond to the domains one to one.

In some implementations, the packet sent by the head node may include a plurality of path extension headers corresponding to all domains through which the transmission path passes (certainly, each path extension header corresponds to one domain). Alternatively, the head node may directly encapsulate all information about the transmission path into the path extension headers and send the packet with the path extension headers, so that subsequent forwarding nodes directly forward the packet according to the path extension headers in the packet.

Figure 11:
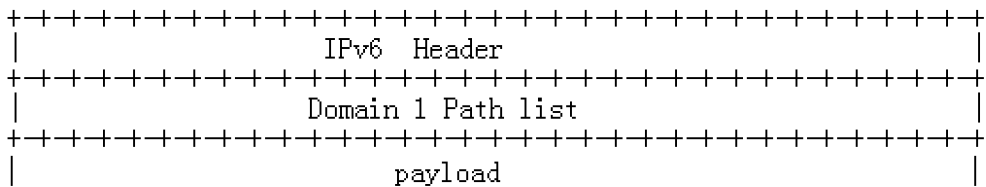
FIG. 11 is a schematic diagram of a format of a packet sent by a head node in a method for sending a packet according to the present disclosure.

For example, if the transmission path is the above R1-R2-R3-S1-S2-S3-R11-R12, and a first domain is Domain1<R1, R2, R3>, a second domain is Domain2<S1, S2, S3>, and a third domain is Domain3<R11, R12>, after a calculation by a network manager or a controller, the head node may encapsulate the packet in the form of FIG. 11.

As shown in FIG. 11, IPv6 Header indicates an IP header in an IPv6 format, payload indicates content (load) of the packet, Domain 1 Path List indicates a list (i.e., a list of addresses) of the Domain1, Domain3 Path List indicates a list (i.e., a list of addresses) of Domain3, and Service List indicates a list of services of the Domain2.

In some implementations, the packet includes path expansion headers corresponding to only a part of domains through which the transmission path passes; the domain, without a corresponding path extension header (i.e., path extension header corresponding to the domain), through which the transmission path passes is a domain to be inserted; and the packet further includes information of insertion indication; the information of insertion indication is configured to indicate a predetermined node to insert a path extension header corresponding to the domain to be inserted into the packet.

In some implementations, the head node may encapsulate only path extension headers corresponding to a part of domains (certainly, each path extension header corresponds to one domain), so that only part of the transmission path can be determined simply according to the path extension headers in the packet sent by the head node; for the domain (i.e., the domain to be inserted) without a corresponding path extension header in the packet sent by the head node, information of insertion indication is expected to be set for indicating a subsequent forwarding node (i.e., a predetermined node) to insert a path extension header corresponding to the domain to be inserted into the packet (detailed later), so that the packet can smoothly pass through the transmission path in the domain to be inserted (certainly, once an insertion of a path extension header corresponding to a certain domain to be inserted is completed, the certain domain is no longer a domain to be inserted).

It should be understood that forms of the information of insertion indication may be various.

For example, the information of insertion indication (e.g., in the list) may include an identifier of a path extension header to be inserted (i.e., the path extension header corresponding to the domain to be inserted), and the identifier includes information of a transmission path of the path extension header to be inserted, thus the predetermined node may instantiate the path extension header according to the identifier.

Alternatively, the information of insertion indication may be only an instruction to indicate a predetermined node to insert a path extension header, and the predetermined node may acquire information of a path extension header to be inserted from a controller or the like according to the instruction, and inserts the path extension header.

In some implementations, the packet includes only a path extension header corresponding to a first domain through which the transmission path passes.

In some implementations, the packet sent by the head node may include only the path extension header corresponding to the first domain through which the transmission path passes, so that all subsequent domains are domains to be inserted, and all the path extension headers corresponding to the subsequent domains are expected to be inserted subsequently.

In some implementations, the predetermined node is a second boundary node, and the second boundary node is a node, in the transmission path in the domain to be inserted, following and adjacent to the transmission path in the domain with a corresponding path extension header (i.e., path extension header corresponding to the domain).

In some implementations, the predetermined node for insertion may be a boundary node, and for example, may be a first node following the transmission path in the domain with the corresponding path extension header (certainly, is a node in the domain to be inserted, and simultaneously may also be the first boundary node described above).

Figure 12:
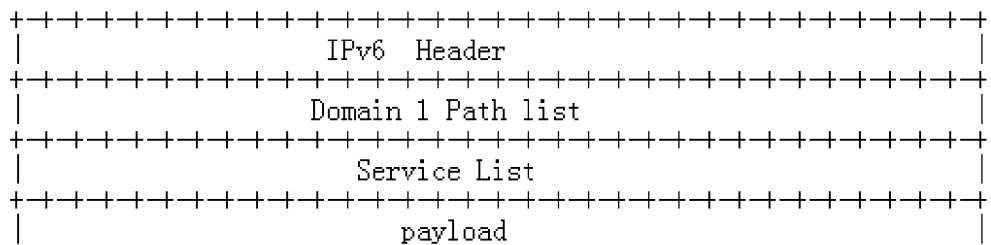
FIG. 12 is a schematic diagram of a format of a packet forwarded by a forwarding node in a method for forwarding a packet according to the present disclosure.

For example, if the transmission path is the above R1-R2-R3-S1-S2-S3-R11-R12, and a first domain is Domain1<R1, R2, R3>, a second domain is Domain2<S1, S2, S3>, and a third domain is Domain3<R11, R12>, then referring to FIG. 12, the packet encapsulated by the head node may include only a path extension header (Domain 1 Pathlist) corresponding to the Domain1, the path extension header (Domain 1 Pathlist) may be in a form of a list of addresses, and, may include a list of addresses of <R1, R2, R3, S1>, the S1 is the second boundary node (also the first boundary node and the predetermined node), the S1 has a special identifier (the information of insertion indication) to indicate that the S1 is the predetermined node, and a subsequent path extension header is to be inserted by the S1.

In some implementations, the predetermined node is a node, in the transmission path in the domain with the corresponding path extension header, previous and adjacent to the transmission path in the domain to be inserted.

In some implementations, the predetermined node may be a last node of the transmission path in the domain with the corresponding path extension header, that is, a path extension header corresponding to a next domain (the domain to be inserted) may be inserted by a last node of a currently existing transmission path.

In a second aspect, the present disclosure provides a method for forwarding a packet, which is applied to a forwarding node.

The method for forwarding a packet provided in the present disclosure is performed for forwarding the packet sent by the head node through the forwarding node.

It should be understood that a packet received by the forwarding node may come directly from the head node (i.e., the forwarding node is a first node following the head node), or may come from other forwarding nodes (i.e., the packet has been forwarded many times).

It should be understood that a form of a packet may be varied during a forwarding process, so that content of the packet received by the forwarding node and content of the packet sent by the head node may not be exactly the same, but the packet received by the forwarding node and the packet sent by the head node are still be regarded as the same packet.

Figure 2:
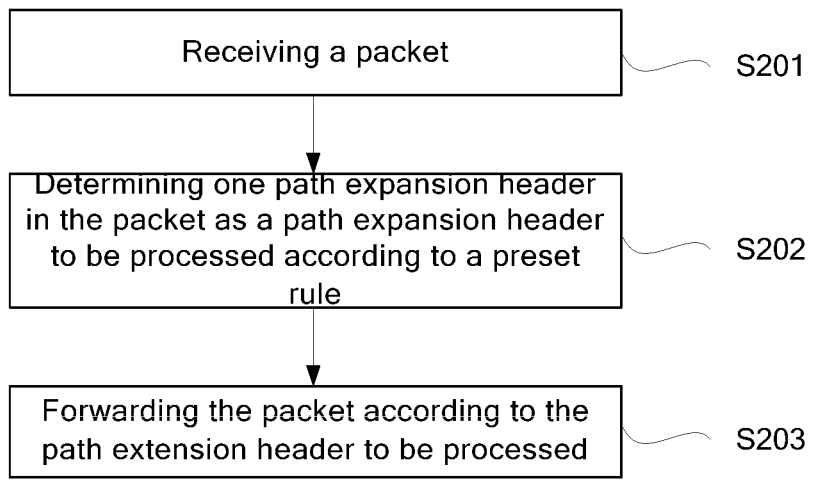
FIG. 2 is a flowchart illustrating a method for forwarding a packet according to the present disclosure.

Referring to FIG. 2, the method for forwarding a packet provided in the present disclosure includes following operations S201 to S203.

At operation S201, receiving a packet.

In the method, a transmission path of the packet passes through at least two domains, the packet includes at least one path extension header, and each path extension header corresponds to one domain through which the transmission path passes and is configured to limit the transmission path of the packet in the one domain.

The forwarding node receives the packet including the path extension header.

At operation S202, determining one path expansion header in the packet as a path expansion header to be processed according to a preset rule.

At operation S203, forwarding the packet according to the path extension header to be processed.

Since the current packet may include a plurality of path extension headers, the forwarding node is desired to determine which path extension header is currently active, i.e., determine one path extension header to be processed currently; then, the forwarding node forwards the packet according to the transmission path defined in the path extension header to be processed.

In some implementations, each path expansion header further includes a pointer; the determining one path expansion header in the packet as a path expansion header to be processed according to a preset rule (the operation S202) includes: determining a first path expansion header with the pointer being not equal to 0 in the packet as the path extension header to be processed; and the forwarding the packet according to the path extension header to be processed (the operation S203) includes: subtracting one from the pointer of the path extension header to be processed, and forwarding the packet.

The pointer may be configured in the path extension header, an initial value of the pointer is equal to total times of forwarding to be performed according to the path expansion header, and after forwarding the packet according to the path expansion head each time, the pointer is subtracted by one; thus, in a case where the pointer is subtracted to zero, it is equivalent to the path expansion header having been "exhausted".

Therefore, in some implementations, in a case where a plurality of path extension headers may exist, the forwarding node may regard a first path extension header with a pointer not 0 (i.e., the path extension header has not been "exhausted") as the path extension header to be processed, forward the packet according to the path extension header to be processed, and subtract one from the pointer.

The forwarding node may further delete the path extension header with the pointer subtracted to zero for reducing an amount of data transmission.

Figure 13:
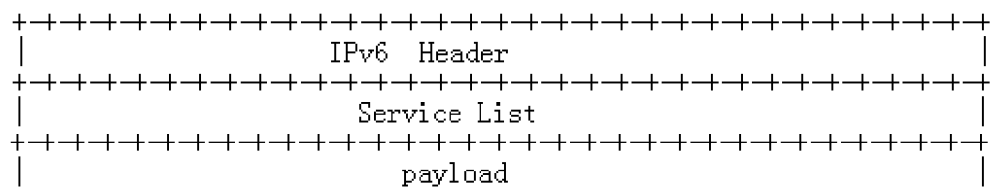
FIG. 13 is a schematic diagram of a format of a packet forwarded by a forwarding node in a method for forwarding a packet according to the present disclosure.
Figure 14:
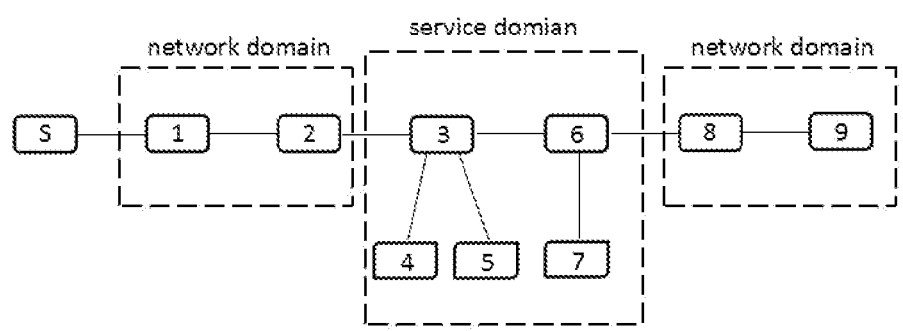
FIG. 14 is a schematic diagram of a transmission path in a process of transmitting a packet according to the present disclosure.

For example, referring to FIG. 13, if the pointer of the path extension header (Domain 1 Pathlist) in the packet is 0, the node can delete the path extension header, so that a structure of the packet sent by the node is as shown in FIG. 14.

In some implementations, the packet further includes information of corresponding indication configured to indicating a path extension header to be processed corresponding to the forwarding node; and the determining one path expansion header in the packet as a path expansion header to be processed according to a preset rule (the operation S202) includes: determining the path expansion header to be processed corresponding to the forwarding node according to the information of corresponding indication.

In some implementations, the information of corresponding indication is configured in the packet to indicate which path extension header each forwarding node corresponds to, and thus, for each forwarding node, the path extension header to be processed corresponding to the forwarding node can be determined according to the information of corresponding indication.

The information of corresponding indication may be located in various positions of the packet, for example, may be located in an IP header (e.g., IPv6 Header), or may be located in a corresponding path extension header (e.g., in a segment identifier of a corresponding node), or the like.

The information of corresponding indication may be in various forms. For example, the information of corresponding indication may be a list of a corresponding relationship between each forwarding node in the transmission path and the path extension header to be processed; or, the information of corresponding indication may be a special identifier for a node that is expected to determine the path extension header to be processed in a special way, or the like.

In some implementations, the determining one path expansion header in the packet as a path expansion header to be processed according to a preset rule (the operation S202) includes: determining a first path expansion header in the packet as the path extension header to be processed; the forwarding the packet according to the path extension header to be processed (the operation S203) includes: in response to that the forwarding node is a last node of the current transmission path defined by the path extension header to be processed, moving the path extension header behind at least one another path extension header, and forwarding the packet.

In some implementations, the forwarding node may determine the current first path extension header in the packet as the path extension header to be processed; therefore, in a case where the forwarding node is the last node of the current transmission path defined by the path extension header to be processed, the current path extension header to be processed is desired to be moved behind at least one another path extension header (may be moved to the last after all the other path extension headers), so that an original second path extension header becomes the first path extension header, i.e., a path extension header to be processed by a next forwarding node.

The last node of the current transmission path may be a last node of the whole transmission path defined by the path extension header to be processed; alternatively, the transmission path defined by the path extension header to be processed may be divided into a plurality of segments (i.e., a plurality of domain segments), and a last node of each domain segment may also be referred to as the last node of the current transmission path.

In some implementations, the packet includes path extension headers corresponding to only a part of domains through which the transmission path passes; the domain, without a corresponding path extension header, through which the transmission path passes is a domain to be inserted; the packet further includes information of insertion indication; the information of insertion indication is configured to indicate a predetermined node to insert a path extension header corresponding to the domain to be inserted into the packet; before the forwarding the packet according to the path extension header to be processed (the operation S203), the method for forwarding a packet further includes an operation S2021.

At operation S2021, in response to that the forwarding node is the predetermined node, inserting the path extension header corresponding to the domain to be inserted into the packet according to the information of insertion indication.

If a current packet (which may be a packet directly sent by the head node or a packet forwarded by the forwarding node) includes only the path extension headers corresponding to only a part of domains, and the forwarding node determines itself to be the predetermined node according to the information of insertion indication, the forwarding node further inserts the path extension header corresponding to the domain to be inserted into the packet according to the information of insertion indication, and then forwards the packet, so that a subsequent forwarding node further forwards the packet according to the path extension header newly inserted.

For example, if the transmission path is the above R1-R2-R3-S1-S2-S3-R11-R12, and a first domain is Domain1<R1, R2, R3>, a second domain is Domain2<S1, S2, S3>, and a third domain is Domain3<R11, R12>, and the packet encapsulated by the head node is as shown in FIG. 12, and only includes a path extension header (Domain 1 Pathlist) corresponding to the Domain1, and the path extension header (Domain 1 Pathlist) includes information of the nodes <R1, R2, R3, S1>, and the S1 is the second boundary node (also the first boundary node and the predetermined node), in a case where the packet is transmitted to the S1 node, the S1 node may add a path extension header corresponding to the next domain (Domain2), that is, insert the Service List as shown in FIG. 13, into the packet.

In some implementations, each piece of information of insertion indication is configured to indicate one predetermined node to insert a path extension header corresponding to one domain to be inserted into the packet.

Figure 3:
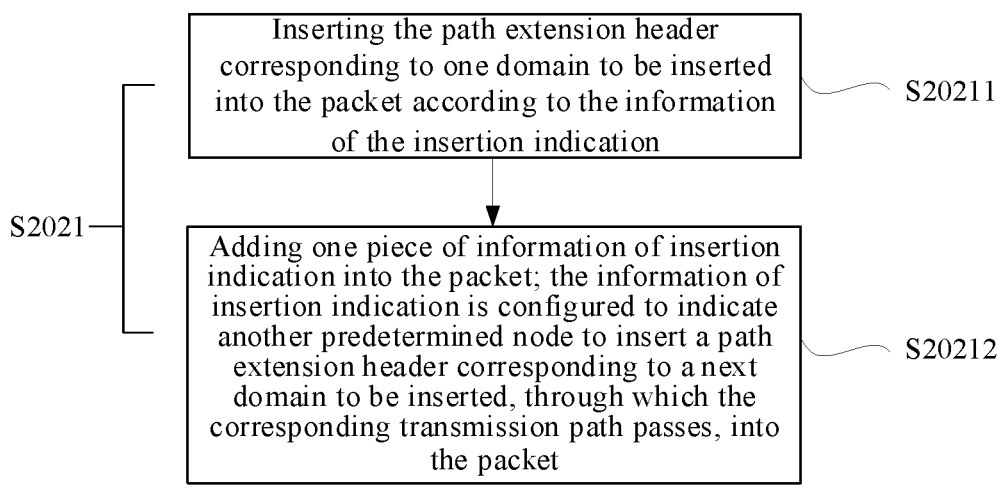
FIG. 3 is a flowchart illustrating a method for forwarding a packet according to the present disclosure.

Referring to FIG. 3, the inserting the path extension header corresponding to the domain to be inserted into the packet according to the information of insertion indication (the operation S2021) includes operations S20211 and S20212.

At operation S20211, inserting the path extension header corresponding to one domain to be inserted into the packet according to the information of insertion indication into the packet.

At operation S20212, adding one piece of information of insertion indication into the packet, with the information of insertion indication added is configured to indicate another predetermined node to insert a path extension header corresponding to a next domain to be inserted, through which the corresponding transmission path passes, into the packet.

That is, each piece of information of insertion indication in the packet is configured to indicate to insert only one path extension header corresponding to the domain to be inserted, the packet sent by the head node may only include a path extension header corresponding to a first domain and information of insertion indication corresponding to a second domain. Therefore, each subsequent predetermined node inserts only one path extension header into the packet, and meanwhile, adds one piece of information of insertion indication (for example, the information may be carried in the path extension header inserted) into the packet, so that a next predetermined node inserts a new path extension header and information of insertion indication again, and so on.

That is, each predetermined node inserts only one next path extension header and adds one piece of information of insertion indication for a next predetermined node performing the same operation.

Certainly, it is also feasible if the packet sent by the head node includes information of insertion indications corresponding to path extension headers corresponding to all domains to be inserted, so that each subsequent predetermined node inserts only the path extension header without adding information of insertion indication.

Figure 4:
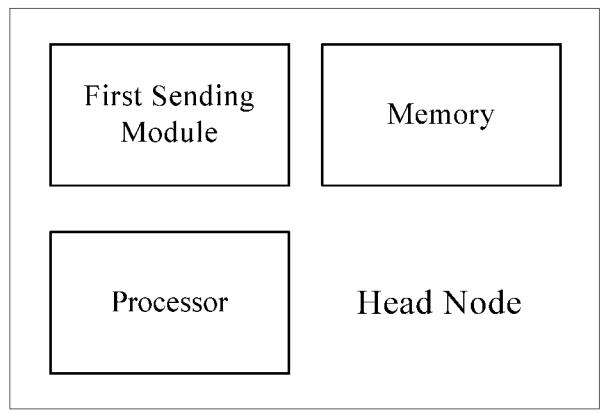
FIG. 4 is a block diagram of a head node according to the present disclosure.

In a third aspect, referring to FIG. 4, the present disclosure provides a head node, including: a first sending module configured to send a packet; at least one processor; and a memory having at least one program stored thereon, the at least one program, when executed by the at least one processor, causes the at least one processor to perform the method for sending a packet described above.

The head node provided in the present disclosure can execute the method for sending a packet described above.

Figure 5:
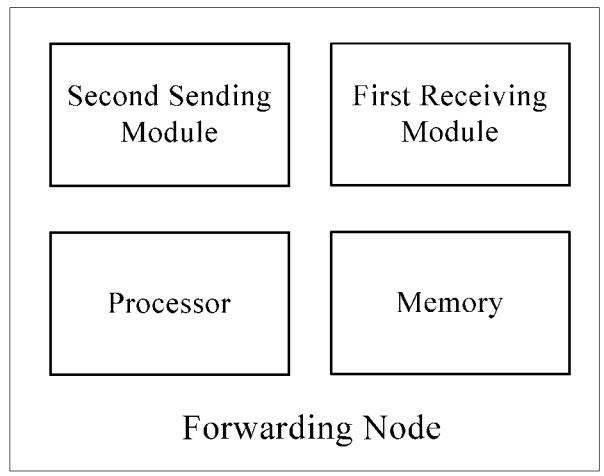
FIG. 5 is a block diagram of a forwarding node according to the present disclosure.

In a fourth aspect, referring to FIG. 5, the present disclosure provides a forwarding node, including: a second sending module configured to send a packet; a first receiving module configured to receive a packet; at least one processor; and a memory having at least one program stored thereon, the at least one program, when executed by the at least one processor, causes the at least one processor to perform the method for forwarding a packet described above.

The forwarding node provided in the present disclosure can execute the method for forwarding a packet described above.

Figure 6:
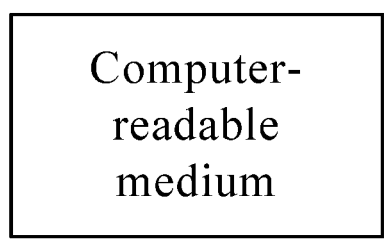
FIG. 6 is a block diagram of a computer-readable medium according to the present disclosure.
Figure 7:
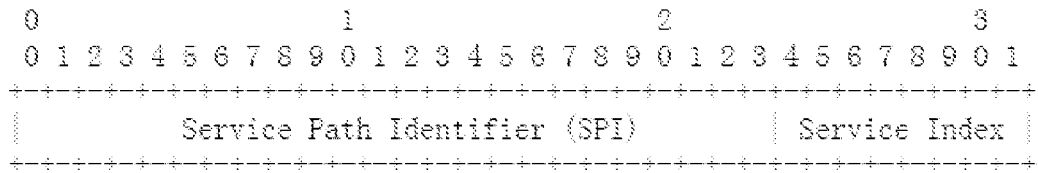
FIG. 7 is a schematic diagram of a format of a network service header carrying a service path identifier according to the present disclosure.

In a fifth aspect, referring to FIG. 6, the present disclosure provides a computer-readable medium having a computer program stored therein, the computer program, when executed by a processor, performs the method for sending a packet or the method for forwarding a packet described above.

The processor is a device having a capability of processing data, which includes, but is not limited to, a central processing unit (CPU), and the like; the memory is a device having a capability of storing data, which includes, but is not limited to, a random access memory (RAM, in particular, SDRAM, DDR, and the like), a read only memory (ROM), an electrically erasable programmable read only memory (EEPROM), and a FLASH; and the I/O interface is connected between the processor and the memory, is configured to implement information interaction between the processor and the memory, and includes, but is not limited to, a bus and the like.

Some examples of transmitting a packet provided in the present disclosure are described below.

EXAMPLE 1

Figure 15:
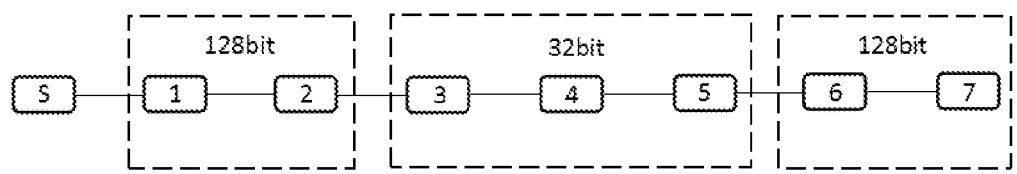
FIG. 15 is a schematic diagram of a transmission path in a process of transmitting a packet according to the present disclosure.

In this example, a transmission path of a packet is as shown in FIG. 15.

As shown in FIG. 15, a node S is a head node, and the packet is forwarded in a sequence from a node 1 to a node 9.

Nodes 1, 2, 8, and 9 belong to a path domain, or a network forwarding domain (network domain), and in particular, the nodes 1 and 2 are in one domain segment, and the nodes 8 and 9 are in another domain segment; nodes 3 to 7 belong to a service domain, and in particular, the nodes 3, 6 are SFFs, and the nodes 4, 5 and 7 are SFs.

A SRH is configured to serve as a path extension header in the packet, and the packet may be transmitted in any one of following modes.

A first mode may include following operations A1011 to A1017.

At operation A1011, the head node S encapsulates a packet and sends the packet.

A format of the packet sent by the head node S is: DA=IP1; SRH1<1,2;SL=1>; SRH2<3,4,5,6,7;SL=4>; SRH3<8,9;SL=2>.

Each SRH serves as one path extension header, numbers in angle brackets are segment identifiers corresponding to the nodes, SL is a pointer, and DA is a current destination address.

According to the first mode, the head node S regards the nodes 1 and 2 as a first domain, the nodes 3 to 7 as a second domain, and the nodes 8 and 9 as a third domain, and the head node S directly encapsulates path expansion headers corresponding to all the domains into the packet.

At operation A1012, the node 1 receives the packet, finds that the DA is a local address, and a first path extension header with the SL not 0 is SRH1, and thus the node 1 takes the SRH1 as a path extension header to be processed, processes the SRH1 according to a conventional logic, i.e., subtracts one from the SL of the SRH1, updates the DA to IP2, and forwards the packet.

A format of the packet sent by the node 1 is: DA=IP2; SRH1<1,2;SL=0>; SRH2<3,4,5,6,7;SL=4>; SRH3<8,9; SL=2>.

At operation A1013, the node 2 receives the packet, finds that the DA is a local address, and SL of the SRH1 is equal to 0, and thus the node 2 deletes the SRH1 and processes a first path extension header SRH2 with the SL not 0 according to the conventional logic, i.e., subtracts one from the SL of the SRH2, updates the DA to IP3, and forwards the packet.

A format of the packet sent by the node 2 is: DA=IP3; SRH2<3,4,5,6,7; SL=3>; SRH3<8,9; SL=2>.

At operation A1014, operations of the nodes 3 to 6 are similar to the operation of the node 1, and thus are not repeated here.

At operation A1015, an operation of the node 7 is similar to the operation of the node 2, and thus is not repeated here.

At operation A1016, an operation of the node 8 is similar to the operation of the node 1, and thus is not repeated here.

At operation A1017, the last node 9 finally receives the packet.

A second mode may include following operations A1021 to A1027.

At operation A1021, the head node S encapsulates a packet and sends the packet.

A format of the packet sent by the head node S is: DA=IP1; SRH1<1,2,8,9; SL=3>.

According to the second mode, the head node S regards the nodes 1, 2, 8, and 9 as a first domain, the nodes 3 to 7 as a second domain, and the head node S only encapsulates a path expansion header corresponding to the first domain into the packet.

At operation A1022, the node 1 receives the packet, and forwards the packet according to the conventional logic because only one path extension header SHR1 is carried in the packet.

A format of the packet sent by the node 1 is: DA=IP2; SRH1<1,2,8,9; SL=2>.

At operation A1023, the node 2 receives and forwards the packet.

A segment identifier of the node 2 is distinctively marked in the SRH1 (i.e., information of insertion instruction is configured), so as to indicates that if the current DA is an IP of the node 2, an operation of inserting a path extension header is to be performed, i.e., an operation of inserting a path extension header SRH2 corresponding to the service domain is to be performed.

A format of the packet sent by the node 2 is: DA=IP3; SRH2<3,4,5,6,7; SL=3>; SRH1<1,2,8,9; SL=2>.

At operation A1024, the nodes 4 to 6 take a current first path extension header SRH2 with the SL not 0 as a path extension header to be processed, and forward the packet according to the conventional logic.

A format of the packet sent by the node 6 is: DA=IP7; SRH2<3,4,5,6,7; SL=0>; SRH1<1,2,8,9; SL=2>.

At operation A1025, the node 7 receives the packet, and a current first path extension header with the SL not 0 is the SRH1, and thus the node 7 forwards the packet according to the SRH1 by the conventional logic and deletes the SRH2.

At operation A1026, an operation of the node 8 is not repeated here.

At operation A1027, the last node 9 finally receives the packet.

A third mode may include following operations A1031 to A1036.

At operation A1031, the head node S encapsulates a packet and sends the packet.

A format of the packet sent by the head node S is: DA=IP1; SRH1<1,2,8,9; SL=3>; SRH2<3,4,5,6,7; SL=5>.

According to the third mode, the head node S regards the nodes 1, 2, 8, 9 as a first domain, and the nodes 3 to 7 as a second domain, and the head node S directly encapsulates path expansion headers corresponding to all the domains into the packet.

At operation A1032, the node 1 receives the packet, takes a first path extension header SRH1 as a path extension header to be processed, processes the SRH1 according to the conventional logic, and forwards the packet.

A format of the packet sent by the node 1 is: DA=IP2; SRH1<1,2,8,9;SL=2>; SRH2<3,4,5,6,7;SL=5>.

At operation A1033, the node 2 receives and forwards the packet.

A segment identifier of the node 2 is distinctively marked in the SRH1 (i.e., information of insertion instruction is configured), so as to indicates to jump to the SRH2 for processing, and thus the node 2 subtracts one from the SL of the SRH2, updates the DA to IP3, and forwards the packet.

A format of the packet sent by the node 2 is: DA=IP3; SRH1<1,2,8,9;SL=2>; SRH2<3,4,5,6,7;SL=4>.

At operation A1034, segment identifiers corresponding to the nodes 3 to 6 are also distinctively marked (i.e., information of insertion instructions are configured), so as to indicate that a current path extension headers of the nodes 3 to 6 is not the current first path extension header SRH1, but SRH2, thus the nodes 3 to 6 forward the packet according to the SRH2.

A format of the packet sent by the node 6 is: DA=IP7; SRH1<1,2,8,9;SL=2>; SRH2<3,4,5,6,7;SL=0>.

At operation A1035, operations of the nodes 7 and 8 are not repeated here.

At operation A1036, the last node 9 finally receives the packet.

EXAMPLE 2

In this example, a transmission path of a packet is as shown in FIG. 16.

As shown in FIG. 16, a node S is a head node, and the packet is forwarded in a sequence from a node 1 to a node 7.

All nodes belong to a path domain, for example, the nodes 1 and 2 are in a domain segment with an address in a format of 128 bits, the nodes 6 and 7 are in another domain segment with an address in a format of 128 bits, and addresses of the nodes 3 to 5 are in a compressed format of 32 bits.

A SRH is configured to serve as a path extension header in the packet, and the packet may be transmitted in any one of following modes.

A first mode may include following operations A2011 to A2017.

At operation A2011, the head node S encapsulates a packet and sends the packet.

A format of the packet sent by the head node S is: DA=IP1; SRH<1,2,6,7;SL=3>; SRH'<3,4,5;SL=3>.

The SRH and the SRH' are path extension headers, numbers in angle brackets are segment identifiers corresponding to the nodes, SL is a pointer, and DA is a current destination address.

According to the first mode, the head node S regards the nodes 1, 2, 6, and 7 as a first domain, and the nodes 3 to 5 as a second domain, and the head node S directly encapsulates path expansion headers corresponding to all the domains into the packet.

At operation A2012, the node 1 receives the packet, takes the SRH as a path extension header to be processed, and forwards the packet according to the SRH.

A format of the packet sent by the node 1 is: DA=IP2; SRH<1,2,6,7;SL=2>; SRH'<3,4,5;SL=3>.

At operation A2013, the node 2 receives and forwards the packet.

A segment identifier of the node 2 is distinctively marked in the SRH (i.e., information of insertion instruction is configured), and thus the node 2 moves the SRH behind the SRH'.

A format of the packet sent by the node 2 is: DA=IP3; SRH'<3,4,5;SL=2>; SRH<1,2,6,7;SL=2>.

At operation A2014, the nodes 3 and 4 forward the packet according to a current first path extension header SRH' by the conventional logic.

A format of the packet sent by the node 4 is: DA=IP5; SRH'<3,4,5;SL=0>; SRH<1,2,6,7;SL=2>.

At operation A2015, the node 5 receives the packet, and finds that SL of the SRH' is equal to 0, and thus the node 5 deletes the SRH', takes the SRH as a path extension header to be processed and forwards the packet according to the SRH.

If there is another domain segment with a compressed format of 32 bits after the nodes 6 and 7, and the domain segment is taken as a domain corresponding to the SRH', a segment identifier of the node 5 is also desired to be distinctively marked (i.e., information of insertion instruction is to be configured), and thus the node 5 does not delete the SRH' but moves the SRH' behind the SRH.

At operation A2016, an operation of the node 6 is not described in detail herein.

At operation A2017, the last node 7 finally receives the packet.

In a second mode, the head node S only encapsulates a path extension header SRH including the nodes 1, 2, 6, and 7, the node 2 inserts a path extension header SRH' including the nodes 3, 4, and 5, and the node 5 deletes the SRH' exhausted.

In a third mode, the nodes 1 and 2 are in one domain, the nodes 3 to 5 are in one domain, the nodes 6 and 7 are in one domain, and the head node S encapsulates three path extension headers corresponding to such three domains into the packet, and the nodes 2 and 5 delete the path extension header exhausted.

In the method for sending a packet, the method for forwarding a packet, the head node, the forwarding node and the computer-readable medium provided in the present disclosure, each path extension header of the packet transmitted across domains only defines the transmission path in one domain, and types of nodes, encoding modes, parsing modes, and the like of the transmission path in one domain are all the same, so that the path extension heads are convenient to be encapsulated and identified, and are convenient for planning and processing the transmission path.

It should be understood by those of ordinary skill in the art that all or some of operations in the method, functional modules/components in apparatuses disclosed above may be implemented as software, firmware, hardware, or suitable combinations thereof.

In a hardware implementation, the division between the functional modules/components stated above does not correspond to the division of physical components; for example, one physical component may have a plurality of functions, or one function or operation may be performed through cooperation of several physical components.

Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium include, but are not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A method for sending a packet, applied to a head node, comprising: generating a packet according to a transmission path, and sending the packet, wherein the transmission path passes through at least two domains, the packet comprises a plurality of path extension headers, and each of the path extension headers corresponds to only one domain through which the transmission path passes and is configured to define the transmission path of the packet in the one domain, the path expansion headers correspond to multiple ones of the domains, through which the transmission path passes, one to one.

2. The method of claim 1, wherein each path extension header comprises a list comprising information of the transmission path in the domain corresponding to the path extension header.

3. The method of claim 1, wherein at least part of the at least one path extension header comprises information of a first boundary node, wherein the first boundary node in each path extension header is a node, in the transmission path, adjacent to the transmission path in the domain corresponding to the path extension header.

4. The method of claim 3, wherein the first boundary node in each path extension header is a node, in the transmission path, following and adjacent to the transmission path in the domain corresponding to the path extension header.

5. The method of claim 1, wherein the path expansion headers of the packet correspond to only a part of domains in the domains through which the transmission path passes; the domain, without a path extension header corresponding to the domain, through which the transmission path passes, is a domain to be inserted; and the packet further comprises information of insertion indication; the information of insertion indication is configured to indicate a predetermined node to insert a path extension header corresponding to the domain to be inserted into the packet.

6. The method of claim 5, wherein the packet comprises the path extension header corresponding to a first domain through which the transmission path passes.

7. The method of claim 5, wherein the predetermined node is a node, in the transmission path in the domain with the path extension header corresponding to the domain, previous and adjacent to the transmission path in the domain to be inserted; or the predetermined node is a second boundary node, wherein the second boundary node is a node, in the transmission path in the domain to be inserted, following and adjacent to the transmission path in the domain with the path extension header corresponding to the domain.

8. A method for forwarding a packet, applied to a forwarding node, comprising:

receiving a packet, wherein a transmission path of the packet passes through at least two domains, the packet comprises a plurality of path extension headers, and each of the path extension headers corresponds to only one domain through which the transmission path passes and is configured to define the transmission path of the packet in the one domain, the path expansion headers correspond to multiple ones of the domains, through which the transmission path passes, one to one;

determining one path expansion header in the packet as a path expansion header to be processed according to a preset rule; and forwarding the packet according to the path extension header to be processed.

9. The method of claim 8, wherein each path expansion header further comprises a pointer;

the determining one path expansion header in the packet as a path expansion header to be processed according to a preset rule comprises: determining a first path expansion header with the pointer not 0 in the packet as the path extension header to be processed; and the forwarding the packet according to the path extension header to be processed comprises:

subtracting one from the pointer of the path extension header to be processed, and forwarding the packet.

10. The method of claim 8, wherein the packet further comprises information of corresponding indication configured to indicate the path extension header to be processed corresponding to the forwarding node; and the determining one path expansion header in the packet as a path expansion header to be processed according to a preset rule comprises: determining the path expansion header to be processed corresponding to the forwarding node according to the information of corresponding indication.

11. The method of claim 8, wherein the determining one path expansion header in the packet as a path expansion header to be processed according to a preset rule comprises:

determining a first path expansion header in the packet as the path extension header to be processed; and the forwarding the packet according to the path extension header to be processed comprises: in response to that the forwarding node is a last node of the transmission path defined by the path extension header to be processed, moving the path extension header behind at least one another path extension header, and forwarding the packet.

12. The method of claim 8, wherein the path extension headers of the packet correspond to only a part of domains in the domains through which the transmission path passes; the domain, without any path extension header corresponding to the domain, through which the transmission path passes, is a domain to be inserted; the packet further comprises information of insertion indication; the information of insertion indication is configured to indicate a predetermined node to insert a path extension header corresponding to the domain to be inserted into the packet;

before the forwarding the packet according to the path extension header to be processed, the method further comprises:

in response to that the forwarding node is the predetermined node, inserting the path extension header corresponding to the domain to be inserted into the packet according to the information of insertion indication.

13. The method of claim 12, wherein each piece of information of insertion indication is configured to indicate one predetermined node to insert the path extension header corresponding to one domain to be inserted into the packet;

the inserting a path extension header corresponding to the domain to be inserted into the packet according to the information of insertion indication comprises:

inserting the path extension header corresponding to one domain to be inserted into the packet according to the information of insertion indication; and adding one piece of information of insertion indication into the packet, with the information of insertion indication being configured to indicate another predetermined node to insert a path extension header corresponding to a next domain to be inserted, through which the transmission path passes, into the packet.

14. A head node, comprising:
a first sending module configured to send a packet;
at least one processor; and
a memory having at least one program stored thereon, the at least one program, when executed by the at least one processor, causes the at least one processor to perform the method for sending a packet of claim 1.

15. A forwarding node, comprising:
a second sending module configured to send a packet;
a first receiving module configured to receive a packet;
at least one processor; and
a memory having at least one program stored thereon, the at least one program, when executed by the at least one processor, causes the at least one processor to perform the method for forwarding a packet of claim 8.

16. A computer-readable medium having a computer program stored therein, the computer program, when executed by a processor, performs the method for sending a packet of claim 1.

17. A computer-readable medium having a computer program stored therein, the computer program, when executed by a processor, performs the method for forwarding a packet of claim 8.

\* \* \* \* \*